United States Patent
Yi et al.

(10) Patent No.: US 9,872,244 B2
(45) Date of Patent: Jan. 16, 2018

(54) METHOD AND APPARATUS FOR SELECTING UPLINK CELL

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 14/893,839

(22) PCT Filed: Jun. 18, 2014

(86) PCT No.: PCT/KR2014/005382
§ 371 (c)(1),
(2) Date: Nov. 24, 2015

(87) PCT Pub. No.: WO2014/204219
PCT Pub. Date: Dec. 24, 2014

(65) Prior Publication Data
US 2016/0112946 A1 Apr. 21, 2016

Related U.S. Application Data (60) Provisional application No. 61/836,637, filed on Jun. 18, 2013.

(51) Int. Cl.
*H04W 48/20* (2009.01)
*H04W 72/12* (2009.01)
(Continued)

(52) U.S. Cl.
CPC ......... *H04W 48/20* (2013.01); *H04W 72/042* (2013.01); *H04W 72/1268* (2013.01); *H04W 72/14* (2013.01); *H04W 72/02* (2013.01)

(58) Field of Classification Search
CPC ............ H04W 48/20; H04W 72/1268; H04W 72/042; H04W 72/14; H04W 72/02
See application file for complete search history.

(56) References Cited

U.S. PATENT DOCUMENTS

| 2005/0249164 | A1 | 11/2005 | Kwak et al. |
| 2012/0201202 | A1* | 8/2012 | Hong ............. H04L 1/1854 370/328 |

(Continued)

FOREIGN PATENT DOCUMENTS

| WO | 2011/162568 | 12/2011 |
| WO | 2012/008705 | 1/2012 |
| WO | 2013/081377 | 6/2013 |

OTHER PUBLICATIONS

PCT International Application No. PCT/KR2014/005382, Written Opinion of the International Searching Authority dated Sep. 25, 2014, 1 page.

*Primary Examiner* — Ajay Cattungal
(74) *Attorney, Agent, or Firm* — Lee, Hong, Degerman, Kang & Waimey (57) ABSTRACT

The present invention related to a method for selecting an uplink cell and an user equipment using the method. The method includes receiving a downlink signal from at least cell of multiple cells, wherein the multiple cells are connected each other via a backhaul, selecting an uplink cell among the multiple cells by selecting a uplink grant for the uplink cell from uplink grants for at least one of the multiple cells, and transmitting a signal to the selected uplink cell.

20 Claims, 7 Drawing Sheets

(51) Int. Cl.
*H04W 72/04* (2009.01)
*H04W 72/14* (2009.01)
*H04W 72/02* (2009.01)

(56) References Cited

U.S. PATENT DOCUMENTS

| | | | |
|---|---|---|---|
| 2013/0039326 A1* | 2/2013 | Kim | H04B 7/024 370/329 |
| 2013/0089029 A1 | 4/2013 | Jang et al. | |
| 2013/0100917 A1* | 4/2013 | Seo | H04W 72/1284 370/329 |
| 2015/0208263 A1* | 7/2015 | Behravan | H04B 7/024 370/252 |
| 2016/0014753 A1* | 1/2016 | Wu | H04B 7/022 370/280 |
| 2016/0014769 A1* | 1/2016 | Papasakellariou | H04B 7/0417 370/329 |

\* cited by examiner

METHOD AND APPARATUS FOR SELECTING UPLINK CELL

CROSS-REFERENCE TO RELATED APPLICATIONS

This application is the National Stage filing under 35 U.S.C. 371 of International Application No. PCT/KR2014/005382, filed on Jun. 18, 2014, which claims the benefit of U.S. Provisional Application No. 61/836,637, filed on Jun. 18, 2013, the contents of which are all hereby incorporated by reference herein in their entirety.

TECHNICAL FIELD

The present invention relates to wireless communications, and more particularly, to a method and apparatus for selecting uplink component carrier for better usage of resource based on user equipment demands.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an enhanced Node B (eNB) and an user equipment (UE) as a Terminal Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment needs to be defined. The efficient operation includes proper monitoring and synchronization timing for small cells and macro cell.

SUMMARY OF INVENTION

Technical Problem

An object of the present invention is to provide a method and an apparatus of effectively using resources, particularly uplink resources and UE power.

Another object of the present invention is to provide a method of effectively using resource according to the demands and capabilities of an user equipment and an apparatus using the method.

Another object of the present invention is to provide a method of effectively using resource based on channel conditions and an apparatus using the method.

Technical Solution

An embodiment of the present invention relates to a method for selecting an uplink cell by an UE mainly and potentially by the network, including receiving scheduling information (e.g., uplink grants) from at least cell one of multiple cells, wherein the multiple cells are connected each other via backhaul and some coordination among multiple cells can be assumed, selecting an uplink cell among the multiple cells by selecting a uplink grant for the uplink cell from uplink grants for at least one of the multiple cells, and transmitting a signal to the selected uplink cell.

Another embodiment of the present invention relates to an user equipment (UE) configured with multiple cells which are connected via backhaul, including a radio frequency (RF) unit for transmitting and receiving a radio signal, and a processor operatively coupled to the RF unit, wherein the processor is configured for selecting an uplink cell among the multiple cells by selecting a uplink grant for the uplink cell from uplink grants for at least one of the multiple cells, wherein the RF unit transmits a radio signal to the selected uplink cell.

Advantageous Effects

According to the present invention, resources in wireless communication can be effectively used.

According to the present invention, resources in wireless communication can be effectively used on demands and capabilities of an user equipment.

According to the present invention, resources in wireless communication can be effectively used in a basis of channel conditions.

MODE FOR INVENTION

Figure 1:
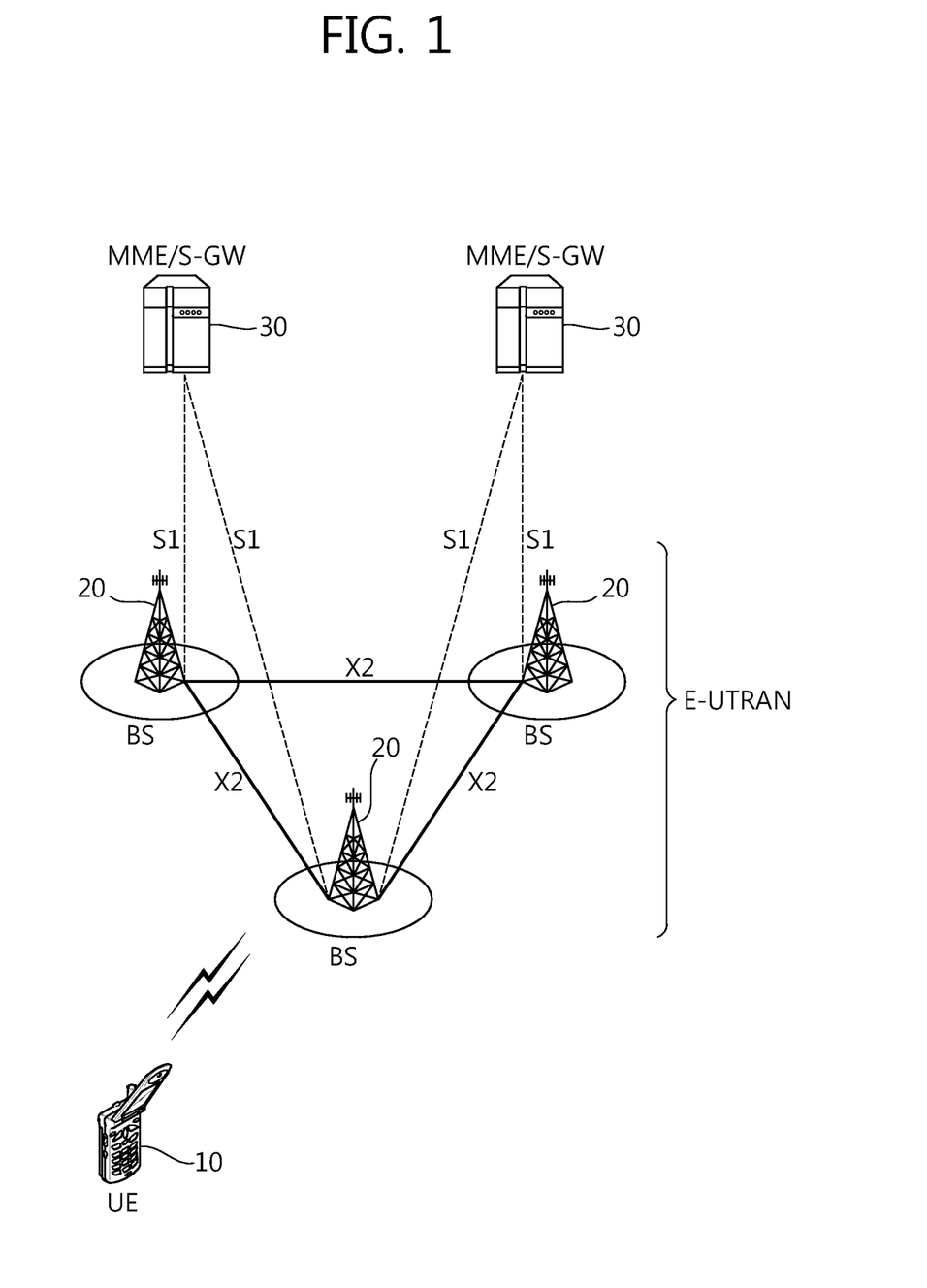
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
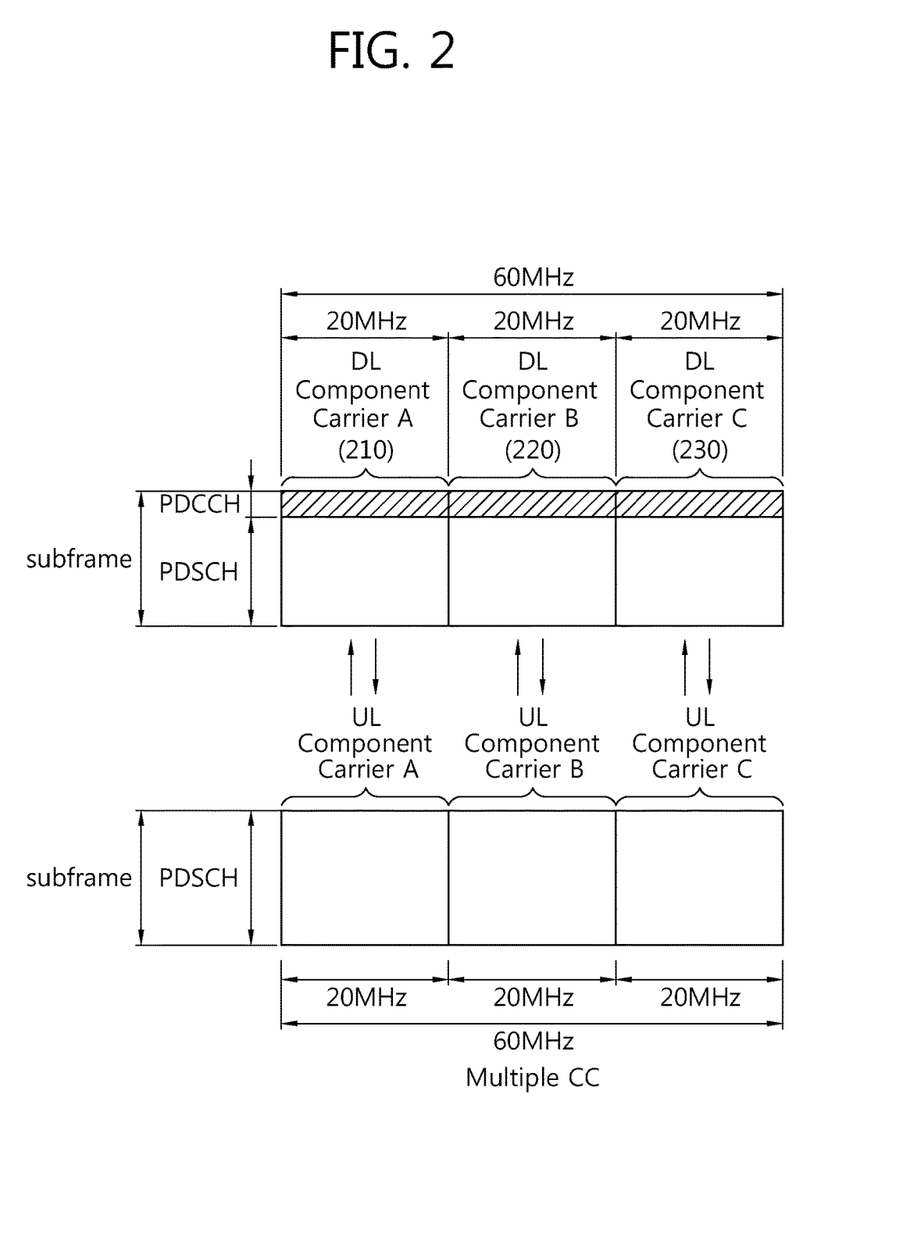
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where $M \leq N$ so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where $L \leq M \leq N$. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
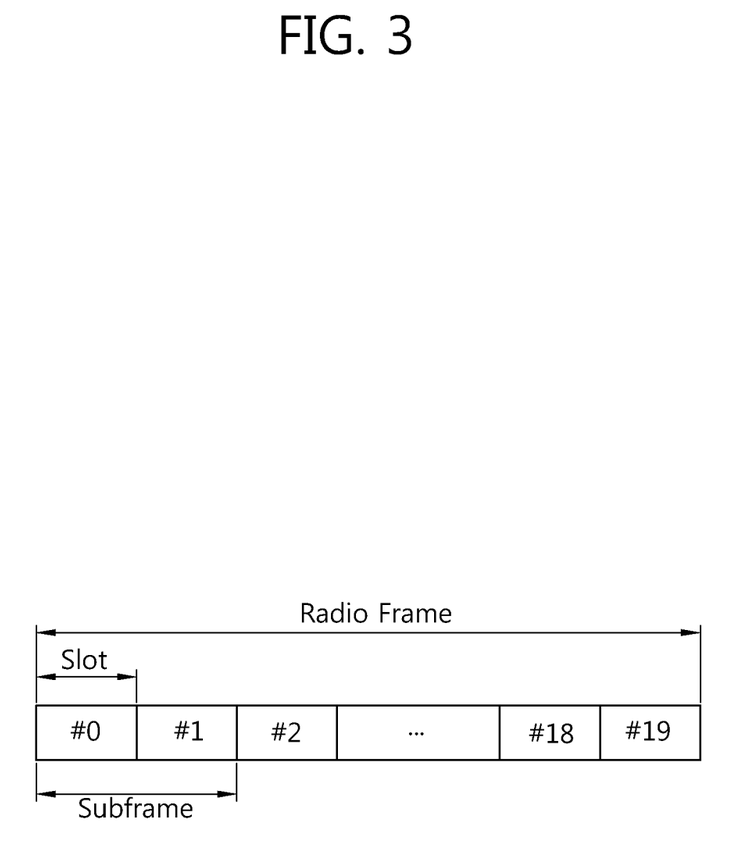
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future communication system including a new type of carrier. The ePDCCH which can be multiplexed with the PDSCH can support multiple Scells of the CA.

Meanwhile, when a UE is configured with multiple (small) cells, a cell for a PUSCH transmission and/or PUCCH transmission may need to be selected by a UE or a serving cell. Here, the multiple cells may be connected via a backhaul, i.e. the UE may operate under coordinated multi-(transmission and reception) point (CoMP) circumstance with a set of collaborating eNBs or cells. In addition, the UE may operate under CoMP like circumstance in which there are some delays in communication between cells i.e. such a connection between cells may be called a non-ideal backhaul.

Since each cell may have different uplink resources and channel conditions (note that downlink channel conditions can be different from uplink channel conditions), the uplink throughput of an UE can be enhanced by exploiting CoMP of CoMP like configuration or a set of collaborating eNBs. For example, a battery of the UE can be saved by transmitting data to the nearest cell with the minimum power or with the highest MCS so that the transmission can be completed with short latency. As the channel conditions change dynamically due to UE mobility, channel characteristics and interference situation changes as well as the uplink resource of each cell changes dynamically, consideration of dynamic selection of the best uplink cell can be considered.

As described above, when a UE is configured with multiple small cells which are connected via non-ideal backhaul or ideal backhaul, the UE may select one cell for a PUSCH transmission and/or PUCCH transmission. Also one cell may be selected by a serving cell for the UE to be used for a PUSCH transmission and/or a PUCCH transmission. At this time, the selection may be performed at least on a subframe.

As uplink quality and available uplink resource may vary depending on channel condition, load level of each cell, TDD configuration, etc., the selected cell can be changed dynamically as well. In terms of selecting the uplink cell, multiple granularity and selection criteria can be considered with a plurality of transmission scenarios.

The selection is performed based on at least one of transmission scenarios, switching granularity and selection criteria. The transmission scenarios concern for a signal to be transmitted through the selected cell.

According to the transmission scenarios, the signal(s) to be transmitted through the selected uplink cell may be determined when uplink cell is selected by a UE or a serving cell.

The switching granularity is for determining how often a UE or a serving cell changes or selects the uplink cell. Even if we call it as a switching granularity, the UE or the serving cell may select the same uplink cell which has been used. According to the switching granularity, the UE or the serving may cell may change the uplink cell to the new one or select new uplink cell among the multiple cells when it is needed to select an uplink cell. Here, the time to select the uplink cell may be decided based on the switching granularity. For example, the uplink cell switching may be performed in a subframe unit, performed at a time or period which are determined at RRC level, or performed based on buffer status report (BSR) i.e. performed in semi-static mode.

According to the selection criteria, the UE or the serving cell may select the uplink cell. For example, the UE or the serving cell may select the uplink cell in view of power saving. Specifically, TDD configuration, load on a cell, modulation and coding scheme (MCS), MIMO capability, number of allocated RBs, and/or assigned power may be considered for selecting the uplink cell.

At least one of the three elements described above (transmission scenarios, switching granularity and selection criteria) may also be used together for selecting the uplink cell. In addition, all the three elements may also be used together for selecting the uplink cell.

Hereinafter, the three elements are fully described one after another with figures.

Transmission Scenarios

The UE or the serving cell may select an uplink cell among the multiple cells which are configured with the UE. Once the selected uplink cell is different from system information block (SIB)-linked uplink cell of the serving cell, multiple approaches of uplink signal transmissions may be considered. The signals transmitted to the selected uplink cell or to the serving cell may be decided based on whether the signal is a control signal or not, and what kind of control signal it is when it is a control signal.

(1)Transmit only PUSCH to the selected uplink cell and transmit other signals to the serving cell including CSI, SR, HARQ-ACK/NACK: The UE may transmit PUSCH only to the selected uplink cell and transmit other signals to the uplink serving cell. The other signals to be transmitted to the uplink cell may include control signals e.g. channel state information (CSI) signal, scheduling request (SR) signal, HARQ-ACK/NACK signal, etc,. Here, the selected uplink cell may be a different uplink cell from the uplink serving cell. In other words, the selected uplink cell can be one of collaborating cells or neighbour cells.

(2) Transmit only PUSCH without uplink control information (UCI) and PRACH to the selected uplink cell and transmit other signals to the serving cell including CSI, SR and HARQ-ACK/NACK (and also PRACH as well? Note that PRACH to both cells may be needed to maintain UE uplink synchronization. If PRACH is initiated based on PDCCH order, CIF or equivalent mechanism can be used to indicate which uplink cell the PRACH is requested for): The UE may transmit PUSCH and physical random access channel (PRACH) to the selected uplink cell and transmit other signals (maybe also including additional PRACH) to the uplink serving cell. The PRACH may be a channel for initial access to the network. The other signals to be transmitted to the uplink cell may include control signals e.g. channel state information (CSI) signal, scheduling request (SR) signal, HARQ-ACK/NACK signal, etc. Here, the selected uplink cell may be a different uplink cell from the uplink serving cell. In other words, the selected uplink cell can be one of collaborating cells or neighbour cells.

(3) Transmit all uplink signals to the selected uplink cell: The UE may transmit all the uplink signals to the selected cell. The uplink signals may include control signals and data signals. Also in this case, the selected uplink cell may be a different uplink cell from the uplink serving cell.

(4) Transmit all uplink signals except for HARQ-ACK to the selected uplink cell and transmit HARQ-ACK via serving cell: The UE may transmit HARQ-ACK/NACK signal to the uplink serving cell and transmit all the other signals to the selected uplink cell. Here, the selected uplink cell may be different from the uplink serving cell.

Besides, any combinations of channels/signals can be considered to divide UE transmission either to another cell or to the serving cell. The examples mentioned here are only for illustration purpose. Depending on the offloading scenarios, the partitioning of channels/signals can be different.

Switching Granularity (1) Uplink cell selection at RRC connection level: The uplink cell may be determined at RRC connected state. For example, if a U-plane cell is configured, the uplink cell may be determined at U-plane configuration or activation. The SIB-linked uplink for the configured U-plane downlink or RRC connected cell may be used when the uplink cell is determined at RRC connected state.

(2) BSR-based uplink cell selection: Assuming a UE is configured with multiple potential uplink cells, the UE may semi-statically change its uplink cell which can be initiated by the UE or the serving cell. The semi-static uplink change may be performed based on any one of selection mechanisms as below.

(i) The serving cell may select an uplink cell from the UE with the best uplink quality based on eNB measurement using UE uplink signals (e.g., SRS or signal on PRACH). Note that the information on measurement based on UE uplink signals may be exchanged among cells. In this case, the information is delivered to at least the UE's serving cell so that the serving cell determines the best cell for uplink transmission for the UE.

(ii) The serving cell may select an uplink cell which shows the lowest uplink load level among candidate uplink cells. For this, two types of information may be exchanged among cells, the uplink load level and the UE quality. At first, the eNB may get the information based on eNB measurement on UE by uplink signals or UE measurement such as radio resource management (RRM), and the information may be exchanged among the cells. The information will be sent to at least the serving cell of the UE so that the serving cell can make a decision.

(iii) UE may select an uplink cell where the SIB-linked downlink cell/CC shows the best downlink quality for the UE. In other words, RRM measurement may be used to determine uplink carrier where the paired downlink carrier shows the best performance, then a UE may assume that the uplink carrier would be the best quality as well. The downlink quality may be estimated based on RRM measurement, etc., and the selection can be done based on UE measurement such as RRM. The serving cell change may be triggered by the current serving cell when a trigger condition is satisfied. For the uplink, it is more flexible in a sense that the UE can switch to different uplink cell upon detecting a better downlink cell. Upon decision on change the uplink, the UE shall notify the serving cell and the chosen uplink cell so that necessary procedure can be established.

(iv) UE may select an uplink cell which shows the lowest uplink load level among candidate uplink cells. To support this, each eNB or the serving cell may indicate uplink load information to a UE either by discovery signal or by higher layer signals. For example, the serving cell may propagate the list of neighbour cells and their uplink load information to the UEs so that UE can select the proper uplink cell. Upon decision on change the uplink, the UE shall notify the serving cell and the chosen uplink cell so that necessary procedure can be established.

(v) UE may select an uplink cell which shows the highest CQI or other CSI measurement in downlink CSI measurement among candidate cells. This requires UE to measure CSI for candidate cells. For this, multiple channel state information-reference signal (CSI-RS) resources may be configured to the UE for CSI measurement. Whether the UE reports multiple CSI feedbacks or not may depend on the configuration by the serving cell. Upon decision on change the uplink, the UE shall notify the serving cell and the chosen uplink cell so that necessary procedure can be established.

If the triggering is initiated by the UE, the UE may transmit BSR only to the selected uplink cell so that the uplink cell, once it has received BSR, can schedule uplink transmissions. If it is triggered by the serving cell, the UE always transmits BSR to the serving cell so that the serving cell configures the uplink cell for uplink transmission.

The serving cell notifies the selected uplink cell if it is different from the serving cell so that uplink grant can be scheduled. Information on buffer status of the UE may be also transmitted to the selected uplink cell for necessary uplink scheduling.

Upon receiving a request for changing uplink cell, the selected uplink cell may accept the request and send a response if the selected uplink cell can accept the UE uplink transmission or the selected uplink cell may reject the request.

If changing of uplink cell is triggered by an UE, the UE may set a timer "UPLINK GRANT WAITING TIMER". If the timer expires, it is assumed that changing of uplink cell was not successful so that it fallbacks to the serving cell and the UE may try again the changing of the uplink cell with the same cell or one of other cells. If the UE receives uplink grant or acknowledgement on the request before the timer expires, the timer resets and the UE may transmit a signal to the changed cell.

Alternatively, a UE can be configured with multiple uplink cells and one uplink cell may become active for time T. A timer "ACTIVE TIMER" would expire after T after activation unless the active timer gets reset by receiving another BSR or other signals which can reset the timer (such as PRACH). The UE may need to perform changing of uplink cell when the active timer is expired.

(3) Uplink cell selection on a subframe level: Changing of uplink cell may occur at subframe-level. If the change of the uplink cell is triggered by the serving cell, the change of the uplink cell may be indicated by either demodulation reference signal (DM-RS) sequence or a scrambling identity nSCID, or indicated using carrier indicator field (CIF) similar to CA or a new field in DCI.

A pre-coordinated scheduling between two cells may be necessary when a backhaul between two cells (the scheduling cell and receiving cell if differs) is non-ideal.

For example, two cells may define a subset of uplink subframes where each cell would expect to receive the data from the UE. Whether the UE in fact transmits uplink PUSCH in each subframe or not may be determined based on eNB implementation (such as DTX detection).

Alternatively, if the UE selects an uplink cell, information on a subset of subframes on which each cell can receive the uplink transmission may be signalled to the UE and UE may select which uplink cell to be used at a certain subframe based on quality or load information dynamically. In this case, the resource used for uplink transmission may not be clear unless it is preconfigured.

Thus, the UE may select an uplink cell based on uplink grants from one or more potential cells.

For example, in a case that a UE have two potential candidate uplink cells (C1 and C2), the UE may transmit its BSR to both C1 and C2. Since C1 and C2 may perform scheduling individually, C1 and C2 may transmit uplink grants independently. The UE may select one uplink grant when multiple uplink grants from multiple cells are received.

The detailed example is shown in. The FIG. 4 briefly describes an example according to the present invention.

As described, a UE may receive multiple uplink scheduling grants when multiple cells schedule uplink grant to a UE. In this case the UE can select one uplink grant. In the example of the FIG. 4, the UE is configured with three uplink cell, that is, the UE has three uplink cell candidates (cell1, cell2 and cell3). The candidate cells are configured with TDD and the TDD configurations of the three cells (cell1, cell2 and cell3).

Figure 4:
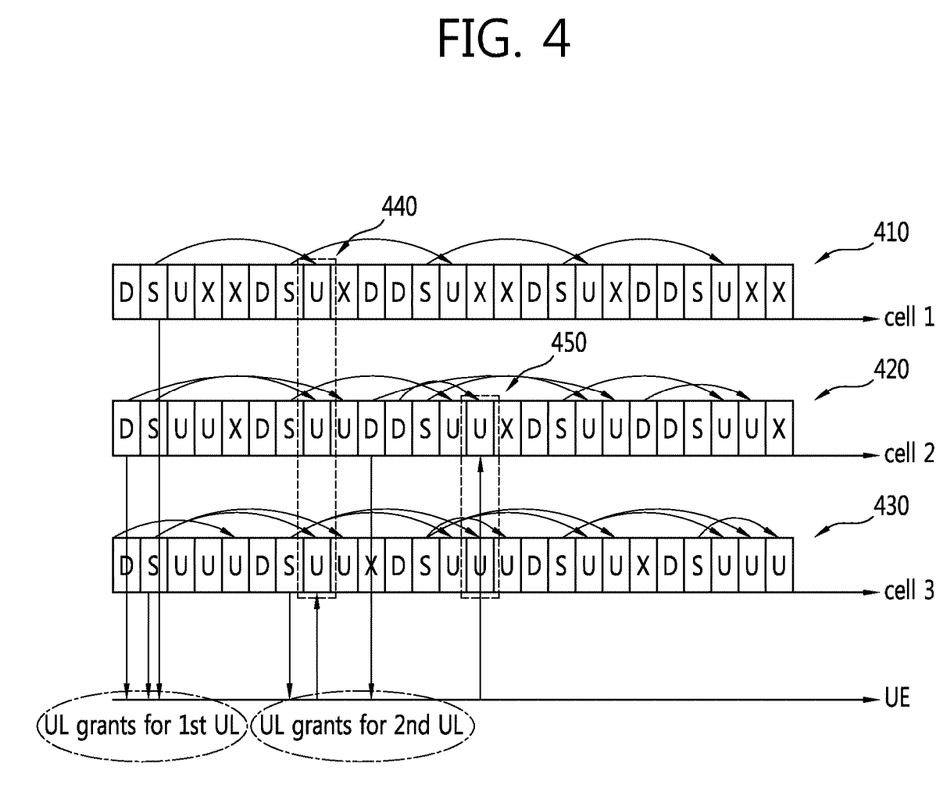
FIG. 4 briefly describes an example according to the present invention.

Referring to FIG. 4, a subframe of 'D' in the TDD pattern 410 for cell1, the TDD pattern 420 for cell2 and the TDD pattern 430 for cell3 is a downlink subframe. A subframe of 'U' is an uplink subframe and a subframe 'S' is a special subframe. The special subframe may be used for uplink signaling or downlink signalling.

Referring to FIG. 4, the UE may transmit uplink signal on the first UL subframe for the UE 440 and second UL subframe for the UE 450. In the example of FIG. 4, there are three uplink grants for the first UL subframe 440. The uplink grants from the cell 1 and cell3 are received at the second subframes and the uplink grant form cell2 is received at the first subframe. The UE may select one uplink grant. In the case of FIG. 4, the UE select an uplink grant from cell3 and transmit an uplink signal to the cell3 on the first UL subframe 440.

Similarly, there are two uplink grants for the second UL subframe 450. The uplink grant from the cell 2 is received at the tenth subframe and the uplink grant form cell3 is received at the seventh subframe. In the example of FIG. 4, the UE select an uplink grant from cell2 and transmit an uplink signal to the cell2 on the first UL subframe 450.

To minimize the impact of unused resource allocated by unused DCI, BSR may be transmitted. That is, a UE may transmit BSR periodically or aperiodically to all candidate uplink cells or a subset of candidate uplink cells (for example, only one or two cells which will transmit UL grant DCI). It can be further assumed that a cell without receiving BSR from the UE for more than 'T', the cell may become inactive for the UE from uplink transmission perspective. In other words, an inactive cell may not transmit uplink grant until it becomes active again to the UE. When an eNB does not detect any PUSCH transmission, it may assume that the quality of uplink grant from itself may not be the best choice for the UE and thus disable UL grant for the next T msec duration (e.g., T=100 msec). In this case, PHICH and retransmission request/grant may be scheduled only if the eNB detects signal in the allocated resource blocks (i.e., PUSCH is attempted). Besides, when BSR is transmitted, the BSR may include ID of the cell to which the UE intends to transmit uplink signal so that unnecessary uplink grant is not scheduled.

Selection Criteria (1) Selection considering TDD configuration: Assuming that a cell C1 and a cell C2 are configured/activated for a UE respectively with TDD configuration 1 and 2, and the UE selects C1 for uplink CC regardless of DL cell. Then, the confliction between a subframe of DL and a subframe of UL may occur, if the UE is receiving data from C2 and is transmitting data to C1 at the same subframe. Depending on whether DL is heavy or UL is heavy at the subframe, it may be determined whether to allow downlink or uplink at the subframe. It may be decided by the UE and the UE may signal it to both cells or to the serving cell(s). Alternatively the serving cell may determine which UL/DL configuration that the UE shall follow (i.e. the appropriate uplink cell for the UE may be determined by the serving cell) based on UE traffic pattern, etc. Regardless of decision, the UE may forward the TDD configuration to be use for uplink transmission to the serving cell and/or the uplink cell so that proper uplink grant and scheduling can be done.

As the cell C1 and the cell C2, cells which are configured with a UE may have different TDD configurations or scheduling with each other. In addition, UEs which are configured with cells may have different TDD configurations or scheduling with each other.

When a UE is configured with multiple cells for downlink and/or uplink in a CoMP setup, each UE may choose the appropriate TDD configuration which serves the UE's traffic demand with the best. The TDD configuration of a UE may be selected separately for downlink and uplink. Once a UE selects a TDD configuration, the UE may forward the selected TDD configuration to all cells within the CoMP set so that necessary DL/UL interference handling can be performed.

Figure 5:
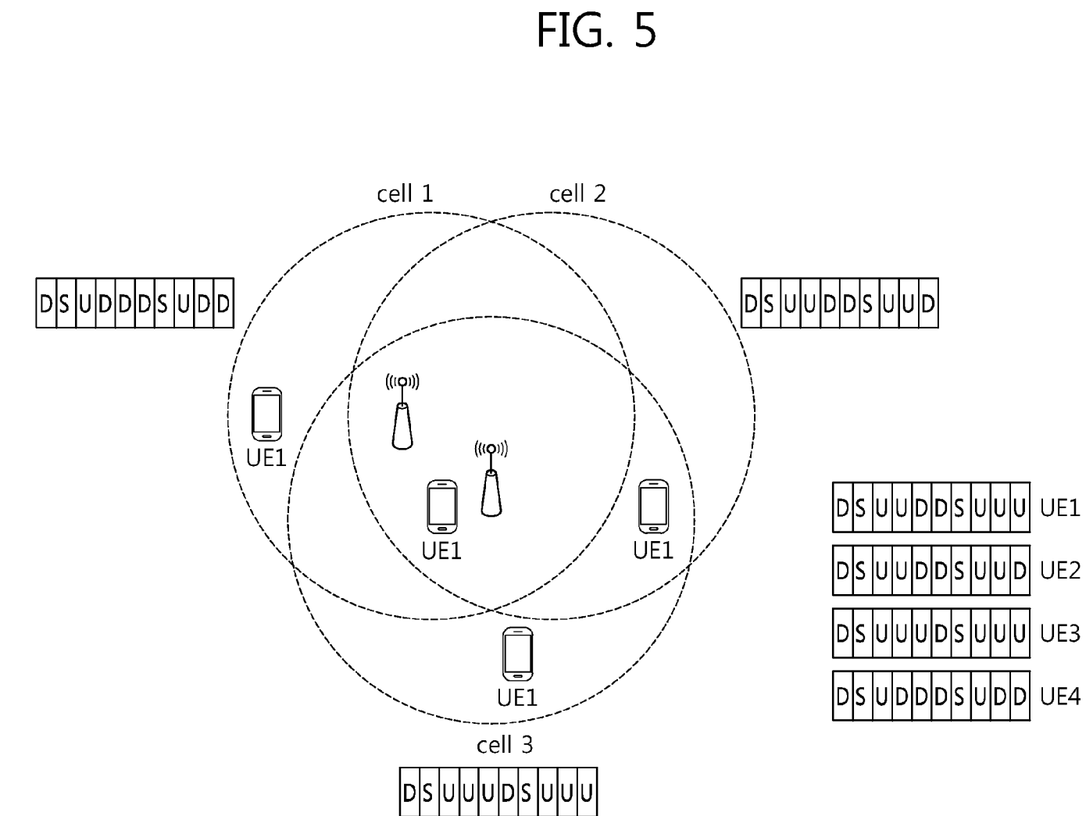
FIG. 5 briefly describes an exemplary embodiment of different TDD configurations according to the present invention.

The FIG. 5 briefly describes different TDD configurations among cells and different TDD configurations selected by each UE configured with the cells. In the example of FIG. 5, three cells (cell1, cell2 and cell3) are configured as transmission/reception points and five UEs (UE1, UE2, UE3, UE4 and UE5) are configured with the three cells. The FIG. 5 describes TDD configurations for the cells and UEs.

Referring to FIG. 5, UE1 chooses TDD configuration as 'DSUUDDSUUU' where 'D' is a downlink subframe, 'U' is an uplink subframe and 'S' is a special subframe. Then each cell (cell1, cell2 and cell3) may schedule downlink or uplink only when the UE's chosen pattern and the cell's TDD configuration matches.

For example, cell1 may transmit to or receive from UE1 with TDD configuration 'DSUXDDSUXX' where 'X' indicates no DL or UL to the UE at the subframe. Cell2 may transmit or receive with TDD configuration 'DSUUDDSUUX' and cell3 may transmit or receive with TDD configuration 'DSUUXDSUUU'. Information on such TDD configuration may be used for uplink/downlink scheduling.

For the subframes with 'X', if that subframe is a DL subframe to transmit uplink grant, the timing will be changed to the previous valid downlink subframe. For example, for cell1, DL subframe transmitting UL grant to the UE1 may be configured as shown in .

Table 1 describes uplink association index k for TDD.

TABLE 1

| n | 0 | 1 | 2 | 3 | 4 | 5 | 6 | 7 | 8 | 9 |
|---|---|---|---|---|---|---|---|---|---|---|
| k |   |   | 6 |   |   |   |   | 6 |   |   |

When PUSCH is transmitted at n th subframe, the uplink grant for the n-th subframe is received at n-k th subframe. In the case of table 1, the uplink grant for the 7th subframe is received at 1st subframe.

Timing for PHICH may also be changed to the next available PHICH downlink subframe when the PHICH downlink subframe is not valid (X for the UE). Alternatively, to avoid the collision with other UE, if PHICH downlink subframe is not valid, PHICH may be disabled for the target PUSCH (only one PUSCH). The UE may assume that PHICH will not be transmitted in such cases.

In this case, PUCCH for each downlink cell may be transmitted to the uplink cell which is SIB-associated with the downlink cell following the timing (e.g., cell1 ? 'DSUXDDSUXX'). Note that similar thing can be applied to downlink direction selection as well.

(2) Selection considering cell load or the number of supporting UEs: A less loaded cell can be selected as an uplink cell for a UE or the uplink cell with lower number of associated users can be selected as an uplink cell. To support this, either an eNB may exchange its load information and/or information on the number of associated users with other cells via backhaul, or an eNB may inform UEs by higher layer signalling, synchronization signals or system information update.

If an UE does not have information on a load and/or information on the number of served UEs for a cell, the serving cell may select the best uplink cell based on the exchanged load information and/or information on RRM measurements at the UE (or UE measurement at eNBs).

Weighted average can be used. For example, MATH 1 may be used when RRM measurement at UE is used.

$$L=\alpha*RSRQ+(1-\alpha)*load\_level \qquad <\text{MATH 1}>$$

Here, $\alpha$ is a weight ($0\leq\alpha\leq1$) and RSRQ is a reference signal received quality. The serving cell may select an uplink cell with lowest L.

Further, MATH 2 may be used when UE measurement at an eNB is used.

$$L=\alpha*SNIR+(1-\alpha)*load\_level \qquad <\text{MATH 2}>$$

Here, SNIR is a signal-to-noise-plus-interference ratio. The serving cell may select an uplink cell with lowest L.

If an eNB measurement is used to determine the uplink cell, the calculated values are either exchanged or the UE measurement results may be exchanged with other cells.

(3) MCS: Higher MCS may be selected for uplink transmission. This may be used when uplink cell is changed per subframe-level with multiple uplink grants received. When a UE receives more than one uplink grants with different MCS values, the UE may select the uplink grant with the highest MCS (which implies that the uplink quality is the best among the candidates).

(4) MIMO support: If a UE supports MIMO capability, uplink grant with MIMO configured is preferred for the selection. This can be done at semi-static level as well as in subframe-level.

At semi-static (RRC) level, a UE may select (if the UE supports uplink MIMO) the uplink cell which supports uplink MIMO as well (i.e., DCI format 4 can be configured). Or, a UE may select the uplink cell with higher priority which transmits DCI format 4 over DCI format 0 when one more uplink grants are received. While the DCI format 0 is used for the scheduling of PUSCH in one UL cell, the DCI format 4 is used for scheduling of PUSCH in one UL cell with multi-antenna port transmission mode.

This criterion can be done at cell association phase when uplink MIMO capability is configured.

(5) Number of RBs allocated: To maximize the throughput and minimize the total uplink transmission latency, an UE may prefer uplink grant with larger number of resource blocks allocated. However, if MCS level is low, a UE may select uplink grant which allows higher TBS by computing based on number of RBs and MCS and MIMO configuration. This criterion can be used with uplink selection at subframe-level.

(6) Assigned power: An uplink cell with lowest power may be selected for uplink transmission for energy saving. To support this, a UE may maintain multiple power control loop which can be adapted dynamically for each candidate uplink cell.

Further, the desired uplink power may be signalled in uplink grant (rather than accumulation value, absolute value can be used as well) if an eNB monitors the UE based on uplink signal. In this case, a new field to contain the power may be used or the mapping between TPC field to absolute value can be pre-configured (or higher layer configured) (such as −1 dB (accumulation value) maps to Pcmax/4, 0 dB maps to Pcmax/2, so on).

Figure 6:
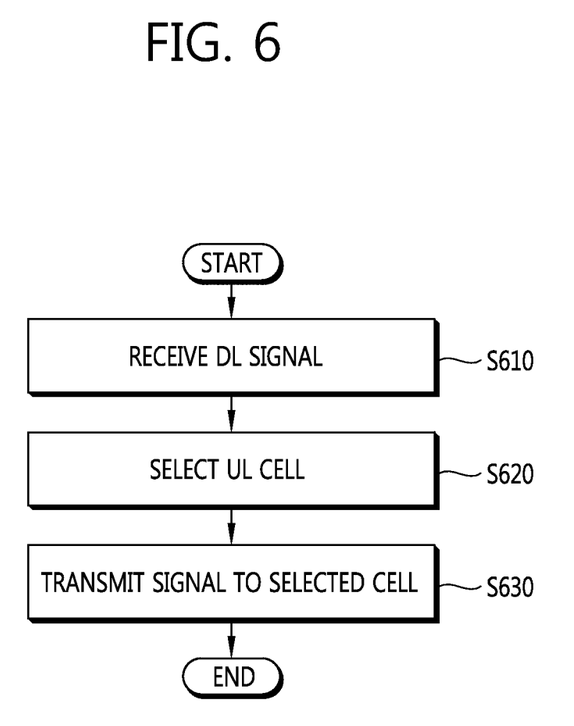
FIG. 6 is a flowchart which explains an operation of a UE based on the described uplink selection according to the present invention.

Note that one or more selection criteria may be used jointly. FIG. 6 is a flowchart which explains an operation of a UE based on the described uplink selection.

Referring to FIG. 6, the UE receives a downlink signal from at least cell of multiple cells at step S610. The multiple cells may be connected each other via a backhaul and the backhaul may be ideal or non-ideal (i.e. there may be a delay in communication between cells). The downlink signal may include a data signal and/or a control signal including an uplink grant.

The UE may select an uplink cell among the multiple cells at step S620. The UE may select uplink cell by selecting an uplink grant for the uplink cell among uplink grants for at least one of the multiple cells. The uplink cell selection may be performed based on at least one of transmission scenarios, switching granularity and selection criteria as described above in detail.

Figure 7:
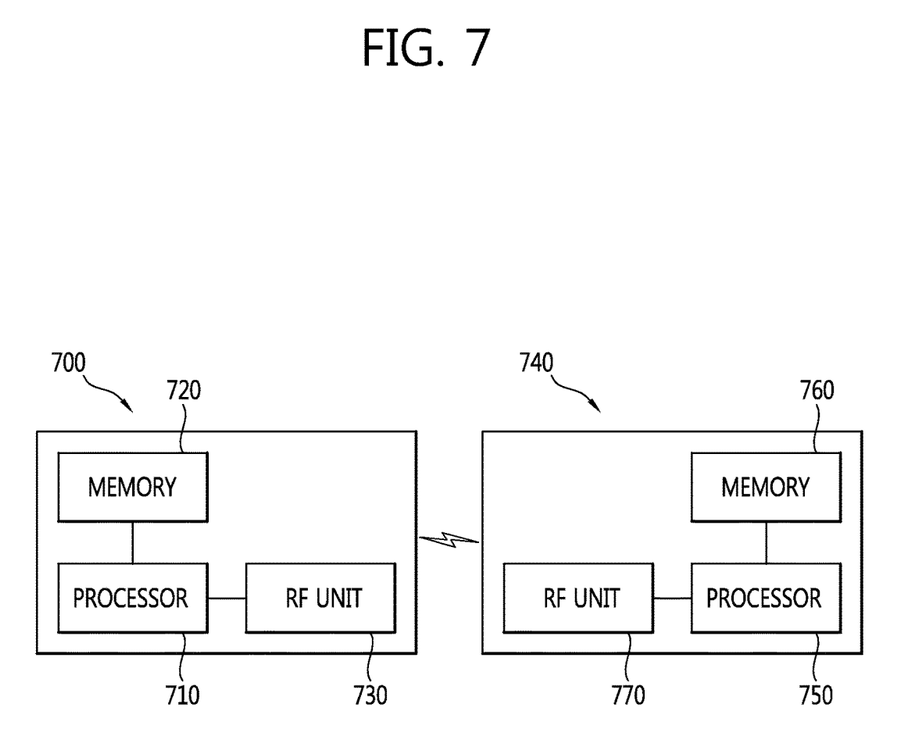
FIG. 7 is a block diagram which briefly describes a wireless communication system based on the present invention.

The UE may transmit a signal to the selected uplink cell at step S630. Once the selected uplink cell is different from the serving cell, multiple approaches of uplink signal transmissions may be considered. For example, the signals transmitted to the selected uplink cell or to the serving cell may be decided based on whether the signal is a control signal or not, and what kind of control signal it is when it is a control signal. The details are described as above. FIG. 7 is a block diagram which briefly describes a wireless communication system including an UE and a BS. The UE and the BS may operate based on the description as explained above. As described above, the BS may be a serving cell, etc.

In view of downlink, a transmitter may be a part of the BS 740 and a receiver may be a part of the UE 700. In view of uplink, a transmitter may be a part of the UE 700 and a receiver may be a part of the BS 740.

Referring to FIG. 7, the UE 700 may include a processor 710, a memory 720 and a radio frequency (RF) unit 730.

The processor 710 may be configured to implement proposed procedures and/or methods described in this application. For example, the processor 710 may select an uplink cell as described before.

The memory 720 is coupled with the processor 710 and stores a variety of information to operate the processor 710, which includes data information and/or control information. The RF unit 730 is also coupled with the processor 710. The RF unit 730 may transmit and/or receive a radio signal.

The BS 740 may include a processor 750, a memory 760 and a RF unit 770.

The processor 750 may be configured to implement proposed procedures and/or methods described in this application. For example, the processor 750 may select an uplink cell as described before.

The memory 760 is coupled with the processor 750 and stores a variety of information to operate the processor 750, which includes data information and/or control information. The RF unit 770 is also coupled with the processor 750. The RF unit 770 may transmit and/or receive a radio signal.

The UE 700 and/or the BS 740 may have single antenna or multiple antennas. The wireless communication system may be called as multiple input/multiple output (MIMO) system when at least one of the UE 700 and the BS 740 has multiple antennas.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

What is claimed is:

1. A method for a user equipment (UE) selecting an uplink cell, the method comprising:
    transmitting a buffer status report (BSR) to at least one first uplink cell among multiple cells that are connected to each other via a backhaul;
    receiving at least one first uplink grant from the at least one first uplink cell;
    selecting at least one second uplink grant from among the at least one first uplink grant, the selection based on a modulation and coding scheme (MCS) of the at least one first uplink grant;
    selecting at least one second uplink cell that transmits the selected at least one second uplink grant from among the at least one first uplink cell; and
    transmitting a first signal to the selected at least one second uplink cell.

2. The method of claim 1, wherein the first signal is transmitted to the selected at least one second uplink cell via a data channel.

3. The method of claim 1, further comprising transmitting a second signal to a serving cell, wherein:
    the first signal is not an uplink control signal; and
    the second signal is the uplink control siqnal.

4. The method of claim 1, wherein the at least one first uplink grant is received independently from the at least one first uplink cell.

5. The method of claim 1, wherein the BSR is transmitted periodically to the at least one first uplink cell for the at least one first uplink grant.

6. The method of claim 5, wherein the BSR is transmitted to a serving cell for the at least one first uplink grant.

7. The method of claim 6, wherein the BSR is transmitted periodically to the serving cell.

8. The method of claim 1, wherein:
    the BSR is transmitted at least once during a time period; and
    the at least one first uplink grant is not received from at least one third uplink cell that does not receive the BSR during the time period.

9. The method of claim 1, wherein the at least one first uplink grant is received from a serving cell.

10. The method of claim 1, wherein:
    the UE and the multiple cells are configured for time division duplex (TDD);
    at least two cells among the multiple cells have different TDD configurations;
    the UE transmits information using a TDD configuration that is selected by the UE;
    the selected TDD configuration is independent of TDD configurations for the multiple cells; and
    the at least one first uplink grant is configured based on the selected TDD configuration.

11. A user equipment (UE) configured with multiple cells, the UE comprising:
- a radio frequency (RF) unit for transmitting and receiving signals; and
- a processor operatively coupled to the RF unit for:
- controlling the RF unit to transmit a buffer status report (BSR) to at least one first uplink cell among multiple cells that are connected to each other via a backhaul;
- controlling the RF unit to receive at least one first uplink grant from the at least one first uplink cell;
- selecting at least one second uplink grant from among the at least one first uplink grant, the selection based on a modulation and coding scheme (MCS) of the at least one first uplink grant;
- selecting at least one second uplink cell that transmits the selected at least one second uplink grant from among the at least one first uplink cell; and
- controlling the RF unit to transmit a first signal to the selected at least one second uplink cell
- that transmits the selected at least one second uplink grant from among the at least one first uplink cell; and
- transmitting a first signal to the selected at least one second uplink cell.

12. The UE of claim 11, wherein the first signal is transmitted to the selected at least one second uplink cell via a data channel.

13. The UE of claim 11, wherein:
- the processor is further for transmitting a second signal to a serving cell;
- the first signal is not an uplink control signal; and
- the second signal is the uplink control signal.

14. The UE of claim 11, wherein the at least one first uplink grant is received independently from the at least one first uplink cell.

15. The UE of claim 11, wherein the BSR is transmitted periodically to the at least one first uplink cell for the at least one first uplink grant.

16. The UE of claim 15, wherein the BSR is transmitted to a serving cell for the at least one first uplink grant.

17. The UE of claim 16, wherein the BSR is transmitted periodically to the serving cell.

18. The UE of claim 11, wherein:
- the BSR is transmitted at least once during a time period; and
- the at least one first uplink grant is not received from at least one third uplink cell that does not receive the BSR during the time period.

19. The UE of claim 11, wherein the at least one first uplink grant is received from a serving cell.

20. The UE of claim 11, wherein:
- the UE and the multiple cells are configured for time division duplex (TDD);
- at least two cells among the multiple cells have different TDD configurations;
- the UE transmits information using a TDD configuration that is selected by the UE;
- the selected TDD configuration is independent of TDD configurations for the multiple cells; and
- the at least one first uplink grant is configured based on the selected TDD configuration.

* * * * *